United States Patent [19]

Witte

[11] Patent Number: 4,772,182

[45] Date of Patent: Sep. 20, 1988

[54] ROTOR VANE ADJUSTING DEVICE

[75] Inventor: Gerd Witte, Frankenthal, Fed. Rep. of Germany

[73] Assignee: Balcke-Dürr AG, Ratingen, Fed. Rep. of Germany

[21] Appl. No.: 65,245

[22] Filed: Jun. 19, 1987

[30] Foreign Application Priority Data

Jun. 21, 1986 [DE] Fed. Rep. of Germany ....... 3620879

[51] Int. Cl.[4] ........................... F01D 7/02; F03D 7/04

[52] U.S. Cl. ..................................... 416/152; 416/160

[58] Field of Search ........................ 416/152, 160, 151

[56] References Cited

U.S. PATENT DOCUMENTS

| | | | |
|---|---|---|---|
| 1,964,102 | 6/1934 | Wishon | 416/152 |
| 2,108,660 | 2/1938 | Farrell | 416/152 X |
| 2,423,400 | 7/1947 | Nichols | 416/152 X |
| 2,738,045 | 3/1956 | Mergen et al. | 416/151 X |
| 3,794,441 | 2/1974 | Johnson | 416/152 |
| 4,047,842 | 9/1977 | Avena et al. | 416/160 X |
| 4,527,072 | 7/1985 | Degeer | 416/160 X |
| 4,578,019 | 3/1986 | Safarik | 416/151 X |

FOREIGN PATENT DOCUMENTS

| | | | |
|---|---|---|---|
| 877565 | 5/1953 | Fed. Rep. of Germany | 416/163 |
| 897904 | 11/1953 | Fed. Rep. of Germany . | |
| 3031390 | 2/1982 | Fed. Rep. of Germany | 416/152 |
| 3426967 | 1/1986 | Fed. Rep. of Germany . | |
| 984485 | 7/1951 | France | 416/152 |
| 197499 | 11/1983 | Japan | 416/152 |
| 569056 | 5/1945 | United Kingdom | 416/152 |
| 302482 | 9/1971 | U.S.S.R. | 416/152 |

*Primary Examiner*—Everette A. Powell, Jr.

*Attorney, Agent, or Firm*—Foley & Lardner, Schwartz, Jeffery, Schwaab, Mack, Blumenthal & Evans

[57] ABSTRACT

An adjusting device for adjustable rotor vanes of a machine rotor including a first gear wheel (34) on a machine shaft (2) and a second gear wheel (44) on an adjusting shaft (4), whereby a relative rotation between the machine shaft and the adjusting shaft can be initiated through a transmission (38) by either of two braking devices (12, 22). The adjusting device of the invention makes it possible to adjust the rotor vanes with a simple construction and with a good degree of efficiency while simultaneously providing good accessibility for assembly and service. A further brake (40, 41) is provided between the transmission (38) and the machine shaft (2) or the adjusting shaft (4) to maintain synchronous rotation of the adjusting shaft (4) with the machine shaft (2) during normal operation, i.e., so long as no adjustment of the rotor vanes (64) is to take place. This further brake (40, 41) is constructed in such a way that when the first braking device (12) or the second braking device (22) is actuated, the braking moment of the further brake (40, 41) is overcome.

18 Claims, 3 Drawing Sheets

ROTOR VANE ADJUSTING DEVICE

BACKGROUND OF THE INVENTION

This invention relates to an adjusting device for adjustable rotor vanes, particularly vanes of a propeller pump or a turbine, having a machine shaft which is provided with a hub with the rotor vanes and which is associated with a first gear wheel, an adjusting shaft which is provided with a second gear wheel and which is arranged coaxially to the machine shaft, a transmission through which a relative rotation can be introduced between the adjusting shaft and the machine shaft, a first braking device for braking the adjusting shaft with respect to the rotating machine shaft and for adjusting the rotor vanes in a first direction, and a second braking device for effecting through said transmission an adjustment of the rotor vanes in a second direction opposite said first direction.

An adjusting device of this general type is known from German Pat. DE-PS No. 897,904, the transmission of which is arranged directly adjacent the hub. The hub is arranged at the end of the massively formed, solid machine shaft, and the transmission as well as the two braking devices are disposed on the side of the hub which faces away from the machine shaft. Supplemental measures must be taken so that the transmission and the braking devices are protected from the flowing medium in the vicinity of the hub. This results in problems with respect to assembly and service, primarily because in pumps or turbines the flow channel and the vicinity of the hub are not necessarily accessible. The transmission is constructed as a differential transmission and contains a bevel gear which is in engagement with the gear wheels which are connected with the machine shaft or with the adjusting shaft. A shaft arranged orthogonally to the machine shaft is connected with this bevel gear, and through this shaft, when one of the braking devices is actuated, the relative rotation is effected through further gear wheels for adjusting the rotor vanes. Because of the arrangement of this shaft and of the transmission on the side of the hub facing away from the machine shaft, this type of adjusting device cannot be readily included in machines in which the hub is arranged at one end of the machine shaft and the adjusting transmission is arranged at the other end of the machine shaft. Further, as a result of frictional effects and the consequent braking effects, relative rotations may occur which can lead to undesired adjustments of the rotor vanes.

An adjusting device for rotor vanes in which the hub with the rotor vanes is arranged at one end of the machine shaft and the transmission is arranged at the other end of the machine shaft is known from West German Published Application DE-OS No. 34 26 967. The machine shaft is constructed as a hollow shaft through which the adjusting shaft extends from the transmission to the hub. A tooth gear is fixedly connected with each of the machine shaft and the adjusting shaft, and the transmission is constructed as a planetary transmission, the drive shaft of which can be selectively turned in one or the other direction by an electric drive motor to adjust the rotor vanes. A consequent expenditure is required for the electric drive motor and its coupling to the transmission as well as the gear wheels, and additional energy must be supplied to effect an adjustment. In turbines there is a requirement that when the load is removed, the rotor vanes must be quickly brought into the sail position in order to prevent any unacceptable running away of the turbine. Since in this known device the transmission is arranged at the other end of the machine shaft from the hub, the adjusting shaft has a relatively large moment of inertia, and in order to make a sufficiently rapid adjustment of the vanes possible, a strong drive motor must be provided. Further, supplemental measures must be undertaken in order to avoid damage to the vanes or adjusting mechanism at high adjusting moments.

SUMMARY OF THE INVENTION

It is the object of the invention to provide an improved adjusting device for adjustable rotor vanes.

Another object of the invention is to provide an adjusting device for adjustable rotor vanes which avoids undesired adjustments as well as excessively large loads on the individual components at modest cost.

A further object of the invention is to provide an adjusting device for adjustable rotor vanes which provides good accessability for simple assembly and service.

Yet another object of the invention is to provide an adjusting device for adjustable rotor vanes which makes it possible to carry out a functionally reliable adjustment of the rotor vanes under all operating conditions with a low material requirement and space requirement.

Additionally it is an object of the invention that the integration and connection of the transmission with the machine shaft as well as the adjusting shaft should be assured with a simple yet reliable construction.

It is also an object of the invention to provide an adjusting device for adjustable rotor vanes which exhibits a high degree of safety in case of disturbances, particularly upon loss of load of a turbine or upon interruption of the power supply.

A still further object of the invention is to provide an adjusting device for adjustable rotor vanes which assures a high degree of efficiency, whereby efficiency losses during normal operation should be avoided.

To achieve these objects it is proposed that between the transmission and the machine shaft or the adjusting shaft a further brake be provided by means of which synchronous rotation of the adjusting shaft with the machine shaft is maintained in normal operation so long as no adjustment of the rotor vanes is to take place, and that when the first braking device or the second braking device is actuated, the braking moment of the further brake is overcome.

Thus, the objects of the invention are achieved by providing an adjusting device for adjustable rotor vanes of a machine rotor comprising a machine shaft provided with a hub with adjustable rotor vanes; a first gear wheel associated with said machine shaft; an adjusting shaft arranged coaxially with said machine shaft; a second gear wheel provided on said adjusting shaft; a transmission through which a relative rotation can be introduced between said adjusting shaft and said machine shaft; a first braking device for braking said adjusting shaft with respect to the rotating machine shaft and adjusting the rotor vanes in a first direction; a second braking device for effecting through said transmission an adjustment of the rotor vanes in a second direction opposite said first direction; and a further brake provided between the transmission and one of the machine shaft and the adjusting shaft by means of which synchronous rotation of the adjusting shaft with the machine shaft is maintained in normal operation so long as no adjustment of the rotor vanes is to be effected, said further brake being constructed in such a manner that when one of the first braking device and the second braking device is actuated, the braking moment of said further brake is overcome.

The proposed adjusting device is distinguished by a high degree of functional reliability with a simple construction. The further brake assures synchronous rotation of the machine shaft and the adjusting shaft so that impermissible adjustments due to frictional influences or to the forces on the vanes are avoided in a functionally reliable manner. An adjustment of the rotor vanes takes place only when the first or second braking device is actuated, and the braking devices are actuated in a simple manner by means of electromagnets which have current flowing through them in normal operation. Upon activation, the braking devices, which are prestressed by spring forces, close, and the adjustment of the rotor blades takes place by means of the energy present in the rotating system, so that in case of a disturbance the rotor vanes can be reliably brought into the sail or neutral position. The high machine power of the machine shaft is utilized in a simple manner in order to carry out an extremely rapid adjustment of the rotor vanes. This is above all of decisive importance in case of a disturbance of the load or interruption of operation in order to bring the rotor vanes into the sail position as quickly as possible. A high degree of efficiency is assured since during normal operation of the rotor machine, relative movements of the transmission parts are reduced to a minimum and or do not occur at all. The activation of the braking device is advantageously effected by means of electromagnets which in view of operational reliability have current flowing through them in normal operation and hold open the braking devices provided for adjusting the rotor vanes. When the current is interrupted, the braking device, which in accordance with the invention is prestressed or biased by weights or springs or in some other corresponding manner, closes so that the rotor vanes are automatically brought into the sail position without any auxiliary energy. The adjusting device can also be adapted in a corresponding manner for pumps so that when they are switched off, the rotor vanes are immediately shut down, for which the energy stored in the rotating system is sufficient, whereby the machine can subsequently be started again with the vanes in the sail position.

In accordance with a specific further embodiment of the invention, a clutch is provided by means of which the first gear wheel is connected for rotation with the machine shaft or the second gear wheel is connected for rotation with the adjusting shaft. The clutch serves to limit the transmissible rotational moment. A high degree of operational safety is assured by means of this clutch which limits the rotational moment, whereby a rapid adjustment can likewise be provided for by appropriate selection of the gear ratio of the transmission. This is particularly pertinent in view of the relatively large moment of inertia of the adjusting shaft which either extends through or coaxially surrounds the machine shaft.

BRIEF DESCRIPTION OF THE DRAWINGS

The invention will be explained hereinafter in further detail with reference to specific working embodiments illustrated in the drawings.

DETAILED DESCRIPTION OF THE PREFERRED EMBODIMENTS

Figure 1:
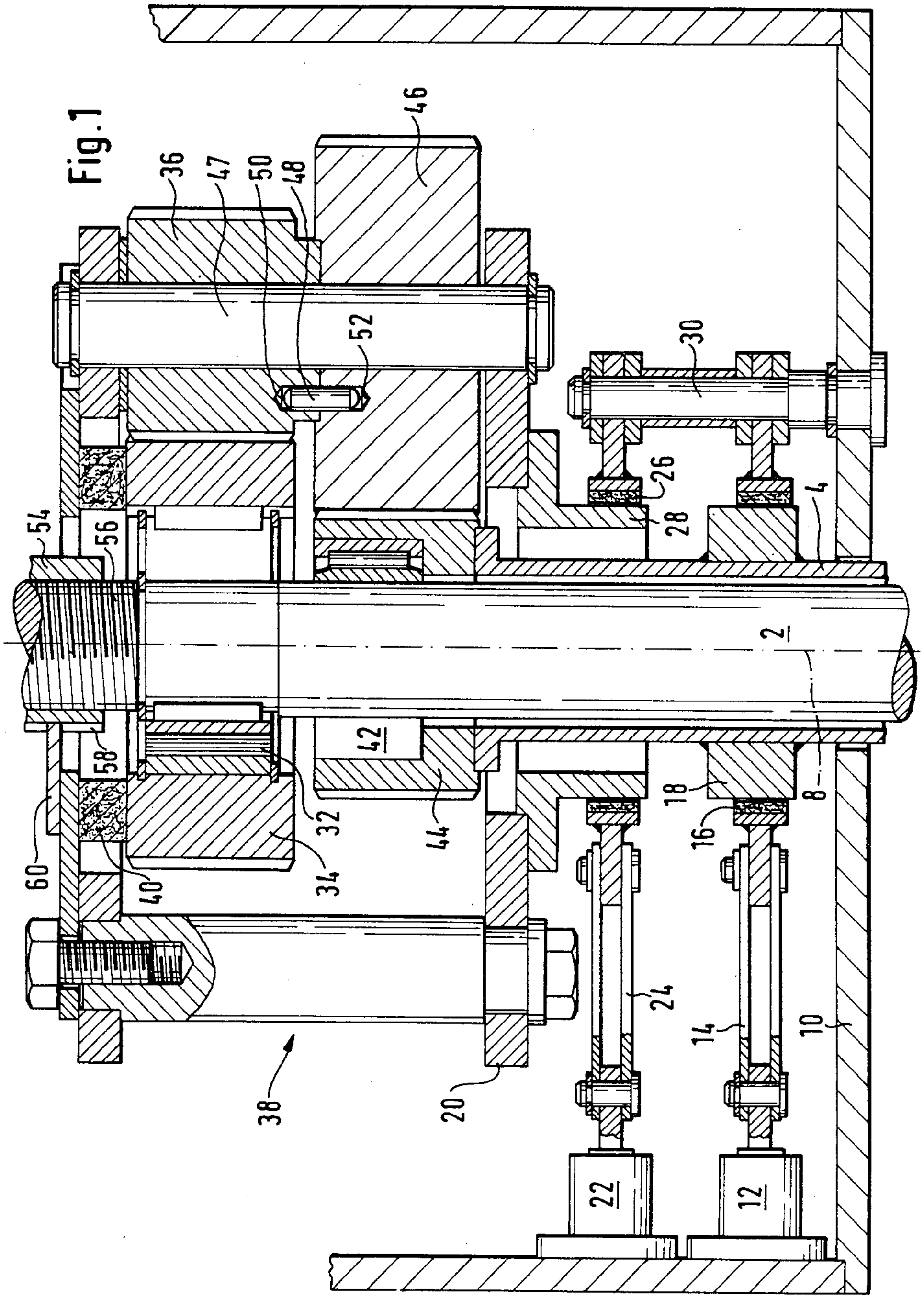
FIG. 1 shows a working embodiment with a planetary transmission and with two braking devices in order to selectively brake the adjusting shaft or the planetary support.

FIG. 1 shows a machine shaft 2 and an adjusting shaft 4 which is coaxial with the machine shaft and which is constructed as a hollow shaft and is likewise rotatable about an axis of rotation 8. In a stationarily arranged housing 10 there is a first braking device 12 which can actuate braking jaws 16 through a lever arm 14 so that the braking jaws can engage a ring 18 connected to the adjusting shaft 4. A second braking device 22 is associated with a planetary support 20, described in more detail hereinafter, in order to actuate braking jaws 26 through a lever arm 24 so that the braking jaws 26 can engage a sleeve 28 connected with planetary support 20. The braking jaws 16 or 26 are pivotally mounted on a bolt 30 on the housing 10.

A first gear wheel 34 is coupled through a clutch 32 with the machine shaft 4. Gear wheel 34 is in engagement with at least one first planetary wheel 36 rotatably mounted on planetary support 20. By means of clutch 32, the maximum rotational moment transmissible from the machine shaft 2 to the transmission 38 and thus to the adjusting shaft 4 can be limited so that overload damage to the mechanism can be reliably prevented. A further brake 40 between the planetary support 20 and the first gear wheel 34 assures that in normal operation in accordance with the invention, i.e., as long as no adjustment is to be undertaken, the planetary support 20 will rotate synchronously with the first gear wheel 34 or with the machine shaft 2.

A second gear wheel 44 is connected in rotationally secure fashion with the adjusting shaft 4. Gear wheel 34 is bearingly mounted on machine shaft 2 through a needle bearing 42. The second gear wheel 44 interengages with at least one second planetary wheel 46. In accordance with the invention, the two planetary wheels 36 and 46 are coupled to each other in a rotationally secure manner and are rotatable together about a common axle 47. In this embodiment, a bolt or pin 48, which engages in blind bores 50 and 52 in each of the planetary wheels 36 and 46, respectively, serves to couple the two planetary wheels. Preferably three pairs of planetary wheels 36 and 46 are arranged in accordance with the invention uniformly distributed around the circumference.

So long as the two braking devices 12 and 22 are in the illustrated released positions, the planetary support 20 and the adjusting shaft 4 rotate synchronously with the machine shaft 2. The two braking devices 12, 22 advantageously contain electromagnets which have current flowing through them in normal operation. If braking device 12 is actuated, then the brake jaws 16 come into contact with ring 18, whereby the adjusting shaft 4 is braked. As a result of the relative movement between the adjusting shaft 4 and the machine shaft 2 caused hereby, an adjustment of the position of the rotor vanes, not shown here in further detail, takes place, for example, in the sense of enlarging the inflow angle. If in contrast the braking jaws 26 of the second braking device 22 are brought into contact with the sleeve 28, then the planetary support is braked. It should be noted that in the context of the present invention the braking moment which can be applied by each of the two braking devices 12 and 22 is larger than the braking moment of the further brake 40 which normally assures synchronous rotation. The first sun gear 34 then drives the second tooth gear 44 through the two planetary wheels 36 and 46 so that the adjusting shaft 4 rotates at a speed of rotation which is greater than the speed of rotation of the machine shaft 2 and the inflow angle is reduced.

A threaded sleeve 54, which engages an external thread 56 on machine shaft 2, serves as a position indicator. The threaded sleeve 54 is provided with an external longitudinal groove 58 parallel to the axis in which a guide piece 60 which is connected with planetary support 20 engages. When relative movement occurs between machine shaft 2 and planetary support 20, the threaded sleeve 54 is moved upwardly or downwardly in accordance with the direction of rotation. Consequently, the axial position of the threaded sleeve 54 is a measure of the instantaneous vane position.

Figure 2:
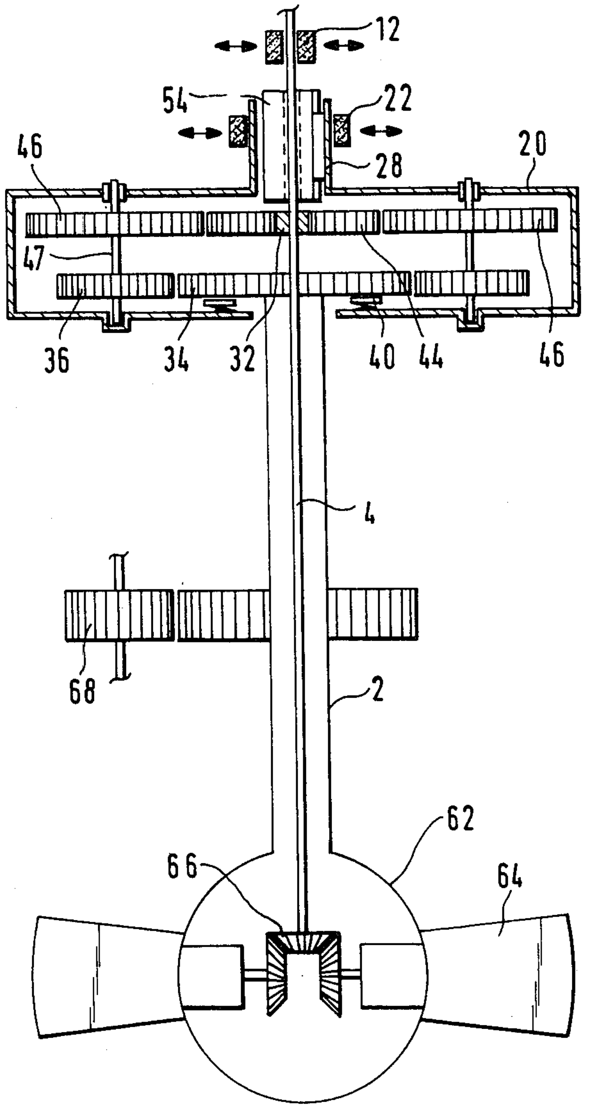
FIG. 2 schematically illustrates a working embodiment in which the adjusting shaft is arranged within the machine shaft which is constructed as a hollow shaft.

FIG. 2 schematically illustrates a working embodiment in which the machine shaft 2 is constructed as a hollow shaft through which the adjusting shaft 4 is extended. At the lower end of machine shaft 2, the hub 62 with rotor vanes 64 is shown, whereby a self-limiting adjusting transmission 66 is advantageously provided. The hydraulic forces acting on the rotor vanes 64 are consequently taken up by the adjusting transmission 66 so that practically only a very small differential moment arises between machine shaft 2 and adjusting shaft 4, which otherwise could lead to an undesired rotational movement between the machine shaft and the adjusting shaft. The further brake 40 provided to assure synchronous rotation between the machine shaft 2 and the planetary support 20 is under practically no load in normal operation because of the self-locking adjusting transmission 66 of the invention. In the case of a turbine, for example, drive is effected through gear wheel 68. If in contrast the rotor machine is a propeller pump, then the drive moment is transmitted to the machine shaft 2 through the gear wheel 68. The adjusting shaft 4 can be braked by the first braking device 12 which is illustrated here schematically, while the second braking device 22 once again acts on the planetary support 20. The clutch 32 which limits the transmissible rotational moment is arranged in this embodiment between the adjusting shaft 4 and the second gear wheel 44 which interengages with planetary wheel 46. Planetary wheel 46 is once again connected with first planetary wheel 36 in a rotationally fixed manner. In the context of this invention, first planetary wheel 36 has a smaller diameter or a smaller number of teeth than second planetary wheel 46. In this embodiment, the two planetary wheels 36 and 46 are also coupled to each other in a rotationally secure manner, whereby the first gear wheel 34 associated with the first planetary wheel 36 is connected with machine shaft 2 in a rotationally fixed manner. The threaded sleeve 54 again serves as a position indicator.

Figure 3:
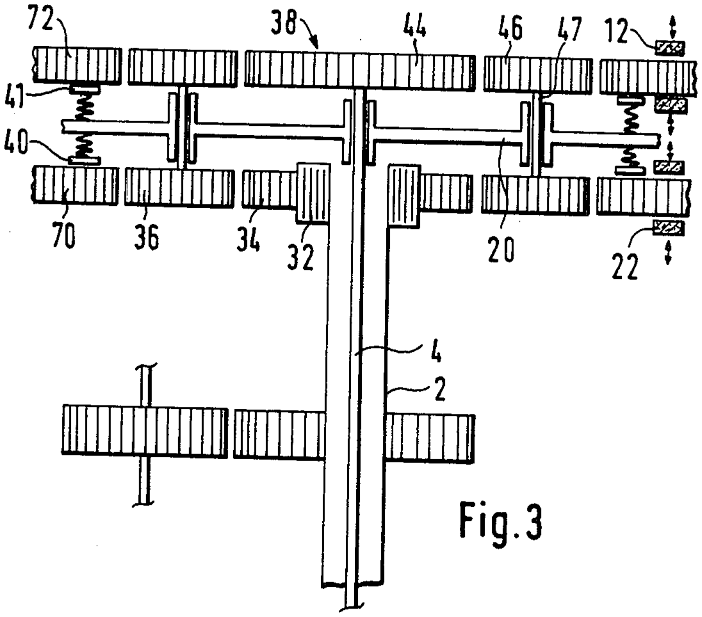
FIG. 3 schematically illustrates a working embodiment in which the transmission is provided with two hollow wheels which can be selectively held in fixed position by means of the braking devices.

FIG. 3 shows an embodiment in which the transmission 38 is provided with two hollow wheels 70 and 72 which are in engagement with the first planetary wheel 36 and second planetary wheel 46, respectively. The planetary support 20 is rotatable with respect to the adjusting shaft 4, which once again is arranged inside the machine shaft 2 which is constructed as a hollow shaft. The first gear wheel 34 is connected with the machine shaft 2 through the clutch 32 which limits the transmissible rotational moment. The braking devices 12 and 22 are constructed as disk brakes and are associated with the hollow wheels 72 and 70 in accordance with the invention. The first braking device 12 can brake hollow wheel 72, while the other hollow wheel 70 can be braked by means of the second braking device 22. A further brake 40 or 41 is provided between the planetary support 20 and each of the two hollow wheels 70 and 72, respectively, in order to assure synchronous rotation of the planetary support 20 and the two hollow wheels 70 and 72 and consequently also of the machine shaft 2 and the adjusting shaft 4 during normal operation in accordance with the invention. If the adjustment is to be moved up, then the upper hollow wheel 72 is braked by means of the first brake 12, whereby the braking moment must be greater than the restraining moment of brake 41 and the adjusting moment. There thus arises a deceleration of the upper hollow wheel 72 with respect to the lower hollow wheel 70 which continues on, whereby a relative movement of the gear wheels 44 and 34 is caused to occur in order to carry out the adjustment. Correspondingly, when the adjustment is to be moved back, the lower hollow wheel 70 is braked by braking device 22, whereby a relative movement occurs with respect to the upper hollow wheel 72 which continues to rotate without change. The relative rotation thereby occurs in the opposite direction to that which occurred when braking with the first braking device 12, so that consequently an opposite adjusting movement also takes place.

Figure 4:
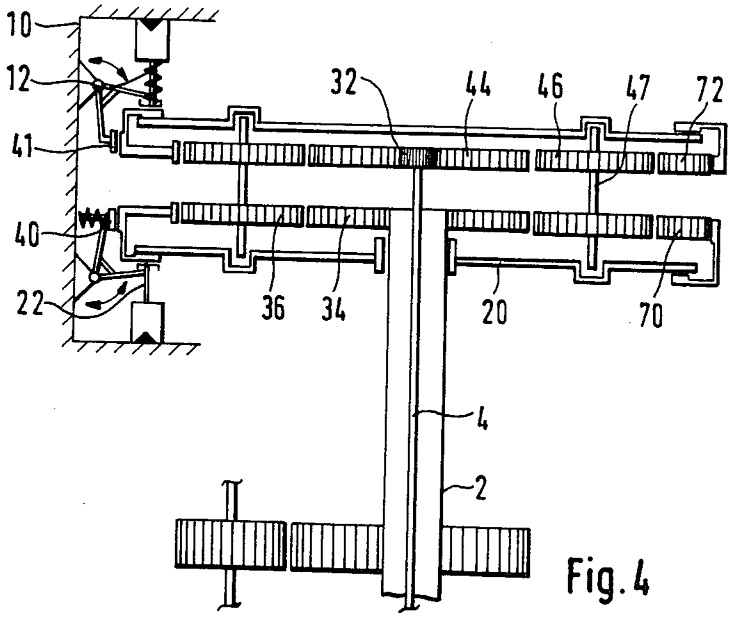
FIG. 4 shows a working embodiment in which the transmission is provided with two hollow wheels which are fixed in position in normal operation and are selectively connectable with the planetary support by means of the braking devices.

Finally, FIG. 4 shows a working embodiment in which during normal operation the two hollow wheels 70 and 72 are braked to a stop with respect to the illustrated housing 10 by means of further brakes 40 and 41. If the adjustment is to be advanced, then the lower hollow wheel 70 is released and simultaneously coupled to the planetary support 20 by means of braking device 22. The relative rotation of the two wheels 70 and 72 is transmitted through the planetary wheels 36 and 46 to the gear wheels 34 and 44. Correspondingly, to retard the adjustment, the upper hollow wheel 72 is released by means of further brake 41 and coupled with the planetary support 20 through braking device 12, so that the two hollow wheels 70 and 72 once again rotate relative to each other, however, in a direction opposite to the initially explained relative rotation, and a reverse adjusting movement is made possible.

The foregoing description has been set forth merely to illustrate the invention and is not intended to be limiting. Since modifications of the described embodiments incorporating the spirit and substance of the invention may occur to persons skilled in the art, the invention should be construed to comprehend everything within the scope of the appended claims and equivalents.

I claim:

1. An adjusting device for adjustable rotor vanes of a machine rotor, said device comprising:

a rotatable machine shaft;

a hub mounted on said shaft;

a plurality of radially directed, adjustable pitch rotor vanes mounted on said hub;

a rotatable adjusting shaft arranged coaxially with said machine shaft and operatively connected to said rotor vanes to adjust the pitch of said rotor vanes in response to relative rotation between said adjusting shaft and said machine shaft;

a first gear wheel mounted on said machine shaft for rotation therewith;

a second gear wheel mounted on said adjusting shaft for rotation therewith;

rotatable transmission means engaging said first gear wheel and said second gear wheel for transmitting rotational movement between said adjusting shaft and said machine shaft;

a first brake engagable with said adjusting shaft for restraining rotation of said adjusting shaft, whereby relative rotation in a first rotational direction is induced between said adjusting shaft and said machine shaft;

a second brake engagable with said transmission for restraining rotation of said transmission, whereby relative rotation in a second rotational direction opposite said first rotational direction is induced between said adjusting shaft and said machine shaft; and a third brake normally engaged at a predetermined braking force between said transmission means and one of said machine shaft and said adjusting shaft for maintaining synchronous rotation between said machine shaft and said adjusting shaft so long as said first brake and said second brake are not engaged, said predetermined braking force of said third brake being selected such that the braking force of said third brake is overridden when one of said first brake and said second brake is engaged.

2. An adjusting device according to claim 1, further comprising a clutch arranged between said transmission and said machine shaft for limiting the rotational moment transmissible between said transmission and said machine shaft.

3. An adjusting device according to claim 1, further comprising a clutch arranged between said transmission and said adjusting shaft for limiting the rotational moment transmissible between said transmission and said adjusting shaft.

4. An adjusting device according to claim 1, further comprising a self-limiting adjusting transmission interposed between said adjusting shaft and said rotor vanes for transmitting rotational movement between said adjusting shaft and said rotor vanes.

5. An adjusting device according to claim 1, wherein said first gear wheel and said second gear wheel are each coaxial with said machine shaft, further comprising at least one first planetary wheel engaging said first gear wheel and at least one second planetary wheel engaging said second gear wheel, said first and second planetary wheels being rotatably arranged in a planetary support around said first and second gear wheels.

6. An adjusting device according to claim 5, further comprising means for connecting said first and second planetary wheels to each other so that they cannot rotate relative to each other.

7. An adjusting device according to claim 6, wherein said means for connecting comprise a pin received in bores in said first and second planetary wheels.

8. An adjusting device according to claim 5, wherein said first and second planetary wheels are aligned to rotate about a common axis and are interconnected to rotate together about said axis.

9. An adjusting device according to claim 1, further comprising a stationary housing enclosing said first brake and said second brake.

10. An adjusting device according to claim 9, wherein said housing also encloses said transmission.

11. An adjusting device according to claim 1, wherein a braking ring is provided on said adjusting shaft, and said first brake comprises a pair of braking jaws between which said braking ring is gripped when said first brake is engaged.

12. An adjusting device according to claim 5, wherein said planetary support is provided with a cylindrical sleeve, and said second brake comprises a pair of braking jaws between which said sleeve is gripped when said second brake is engaged.

13. An adjusting device according to claim 5, further comprising a first hollow wheel engaging said first planetary wheel, a second hollow wheel engaging said second planetary wheel, and wherein one of said first brake and said second brake engages one of said first hollow wheel and said second hollow wheel.

14. An adjusting device according to claim 5, wherein said third brake is arranged to engage between said planetary support of said transmission and said first gear wheel on said machine shaft.

15. An adjusting device according to claim 1, wherein said machine rotor is a propeller pump rotor.

16. An adjusting device according to claim 1, wherein said machine rotor is a turbine rotor.

17. An adjusting device according to claim 5, wherein said planetary support of said rotatable transmission rotates synchronously with said first gear wheel on said machine shaft so long as said first brake and said second brake are not engaged.

18. An adjusting device according to claim 1, wherein said rotatable transmission comprises a single planetary support, and said single planetary support is braked by engagement of said second brake.

* * * * *